April 4, 1944.　　　S. SANOCKI　　　2,346,084
TOOL
Filed March 5, 1943
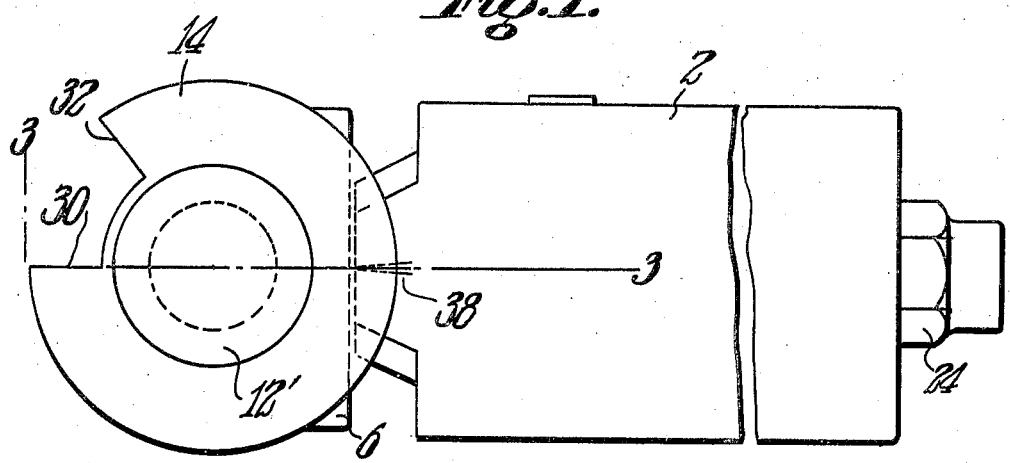
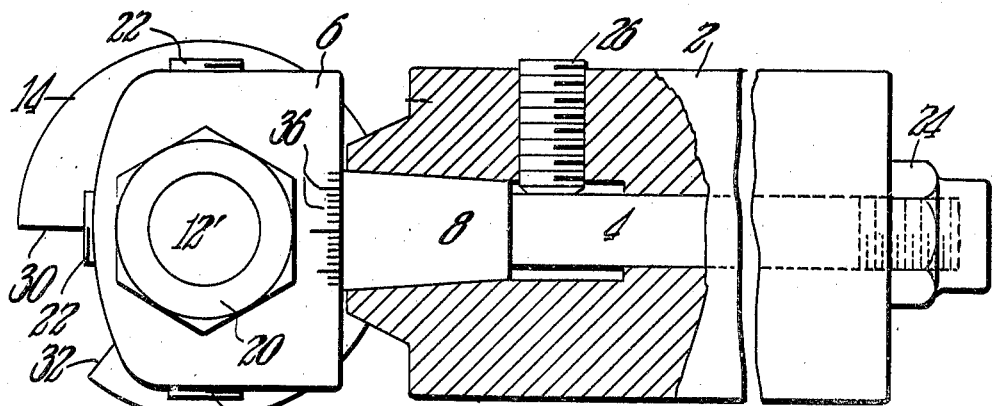
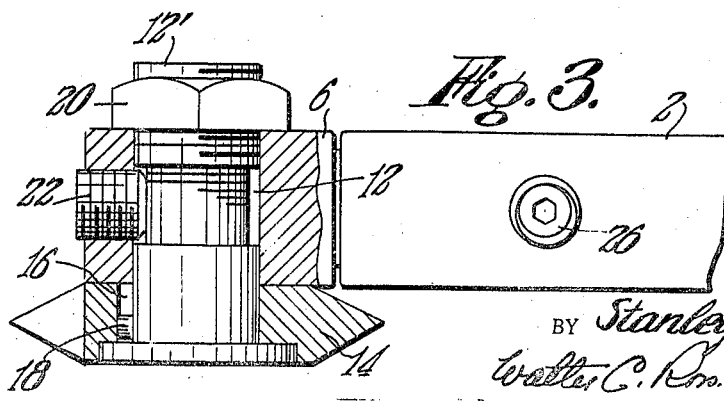
INVENTOR.
BY Stanley Sanocki Patented Apr. 4, 1944

2,346,084

UNITED STATES PATENT OFFICE 2,346,084

TOOL

Stanley Sanocki, Chicopee, Mass.

Application March 5, 1943, Serial No. 478,073

1 Claim. (Cl. 29—98)

This invention relates to improvements in tools and is directed more particularly to tools for metal cutting operations and is adapted for use on machine tools of various kinds.

The principal objects of the invention are directed to the provision of a tool in the form of a metal cutting tool that is adapted for use with various machine tools and has as special features a cutting element that is strong and rigid and which is readily resharpened, while at the same time the construction is characterized by extreme flexibility or adjustability of the components.

Various novel objects and advantages of the invention will be observed from the following description of the present preferred form of the invention.

In the drawing:

Fig. 1 is a side elevational view of a tool construction embodying the novel features of the invention;

Fig. 2 is a similar view with the cutting element in a different position; and

Fig. 3 is a sectional plan view on the line 3—3 of Fig. 1.

Referring now to the drawing more in detail, the invention will be fully described.

A support 2 is provided which is adapted to be engaged in a tool holding unit of a machine tool such as the tool post of a lathe or the like. The support has a longitudinal bore therethrough to receive the shank 4 of a head 6. The said shank has a tapering part 8 fitting in a tapering part of the bore in the support.

The head 6 is provided with a transverse bore 12 which receives a bolt member 12'. A cutting element 14 is carried by the member 12' and it has a keyway 16 receiving a key 18 of the member 12' whereby said member 12' and cutting element are held against relative rotation.

The outer end of the bolt 12' is threaded with a nut 20 thereon and a socket-head set screw 22 in threaded engagement with the head 6 bears on bolt 12'. The nut 20 and set screw hold the bolt 12' against movement relative to the head and in adjusted positions. There may be a plurality of set screws such as 22 if desired.

A nut 24 on the threaded end of the shank 4 and bearing against the end of support 2 draws the taper 8 of the shank into the tapering bore to hold it against rotative movements whereby the head is releasably fixed in various positions of adjustment. A socket-head set screw 26 threaded in the support bears on the shank 4 and cooperates with the nut 24 to hold the shank and thereby the head in position.

It will be noted that the head is adjustable through 360 degrees on an axis longitudinally of the support while the cutting element is adjustable through 360 degrees on an axis opposed to or at right angles to the axis of the shank.

The cutting element may take various forms or have various contours but in the form of the invention shown it has a sharpened periphery or its periphery is in the form of a V. A part of the periphery is cut away to provide cutting edges 30 and 32, as shown.

The particular form of cutting element shown is adapted for cutting V threads in a rod or the like but by slight modifications the element may be changed or modified for cutting threads of other types or making cuts for various purposes.

With the support 2 in the tool post of a lathe or the like, the cutting edge 30 is presented to the work to be cut much in the same manner as is a tool known as a "bit" which is carried in a tool holder. The cutting edge 30 in Fig. 1 will operate on the work and when cutting threads for instance the head and shank may be adjusted to any angular position on the axis of the shank so that the cutting edge 30 is presented at the desired angle for the thread or screw cutting operation.

Markings 36 on the head may be provided for registering with an index character 38 on the support to facilitate setting of the head in the desired position.

When it is necessary to sharpen the cutting edge 30 it is only necessary to grind the cutting surface extending radially of the axis of the cutter since the peripheral side portions are shaped for the particular work. Thus there are numerous successive grinds around the cutter.

Where a bit for cutting threads has to be ground, it is necessary, in addition to sharpening the upper surface, to grind the sides of the tool extending backwardly from the point since any grinding of the upper side changes the shape of the tool.

Rather than grind the surface 30 it is entirely feasible to rotate the head 180 degrees and bring the cutting edge 32 up into position for a cutting operation.

As has been stated, the cutter shown is particularly adapted for making V threads but a cutter may be made for an unlimited variety of operations while embodying the features of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A tool of the class described comprising in combination, a support having a longitudinal shank bore provided with a tapering portion at its forward end, a head member at the forward end of the support having a shank rigidly connected thereto disposed in the shank bore provided with a tapering part in the tapering portion thereof and a free threaded end at the rear end of the support, a nut threadedly engaging the threaded end of the shank for abutting the rear end of the support and drawing the tapering part of the shank into the tapering portion of the bore, said head member provided with a bolt bore disposed on an axis disposed in opposition to that of the shank bore, a cutter bolt extending through said bore having a head spaced from one side of said head and provided with a key, a cutter on said bolt between the head thereof and said head member provided with a keyway receiving said key, said cutter bolt having a nut in threaded engagement with the end thereof at the other side of said head member, said cutter having a peripheral portion of a certain counter with a portion thereof cut away to provide a cutting edge, all adapted and arranged whereby the nuts on the end of the shank and cutter bolt may be adjusted to clamp the parts against relative movement and hold the cutter rigidly and against movement relative to the support or the nut on the cutter bolt may be loosened to permit turning of the cutter bolt for presenting the cutting edge at various points around the axis of the cutter bolt, and set screws threadedly engaging the support and head member for bearing on the shank and cutter bolt respectviely and cooperating with said nuts to hold said shank and cutter bolt against rotation.

STANLEY SANOCKI.